United States Patent [19]
Wenzlaff

[11] 3,883,707
[45] May 13, 1975

[54] AUTOMOTIVE DISTRIBUTOR CIRCUIT BREAKER WITH ECCENTRICALLY MOUNTED, ROLLER BEARING TYPE CAM

[75] Inventor: Robert Wenzlaff, Seattle, Wash.

[73] Assignee: Breakthrough Research & Development Corp., Spokane, Wash.

[22] Filed: Jan. 17, 1974

[21] Appl. No.: 434,295

[52] U.S. Cl. .............. 200/30 R; 64/23.7; 64/31; 200/21; 403/258
[51] Int. Cl. ............................................. H01h 3/42
[58] Field of Search.... 200/19 R, 19 A, 31 R, 31 A, 200/30 R, 30 A, 30 AA, 27 R, 27 BB, 153 LB, 153 L, 21; 64/15, 23.5, 23.6, 23.7, 31; 403/258

[56] References Cited
UNITED STATES PATENTS

| | | | |
|---|---|---|---|
| 2,409,617 | 10/1946 | Elliott et al. | 200/30 R |
| 2,688,665 | 9/1954 | Rigby | 200/30 R |
| 2,813,937 | 11/1957 | Diebold | 200/30 R |
| 3,025,363 | 3/1962 | Bakke | 200/30 A |
| 3,317,808 | 5/1967 | Yott | 200/19 A X |
| 3,646,922 | 3/1972 | Spalding | 200/19 R X |

FOREIGN PATENTS OR APPLICATIONS

| | | | |
|---|---|---|---|
| 868,645 | 10/1941 | France | 200/30 |

Primary Examiner—James R. Scott
Attorney, Agent, or Firm—Wells, St. John & Roberts

[57] ABSTRACT

An improved breaker point actuating apparatus for producing electrical impulses in timed relation to the operational cycle of an internal combustion engine. The apparatus includes a conventional rolling bearing fixed to a distributor drive shaft on an axis eccentric from the rotational axis of the distributor drive shaft. The bearing includes an outer race freely rotatable with rspect to an inner race which in turn is fixed to the distributor drive shaft. An exterior annular surface of the outer race is utilized to engage a wiper associated with a set of contact points. As the distributor drive shaft is rotated, the exterior surface wobbles due to the eccentric bearing axis and is radially reciprocated against the wiper, thereby opening and closing the associated point contacts. Since the outer race is freely rotatable on the inner race, frictional contact between the exterior surface of the outer race and the wiper serves to hold the outer race substantially stationary and thereby substantially reduces frictional wear between the surface and the wiper.

4 Claims, 5 Drawing Figures

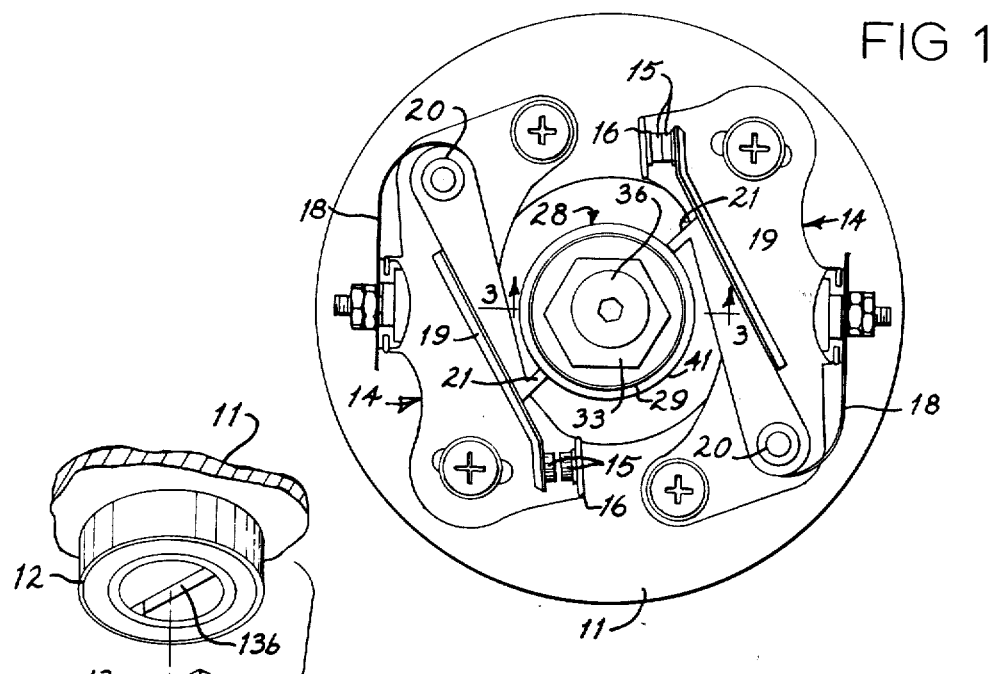
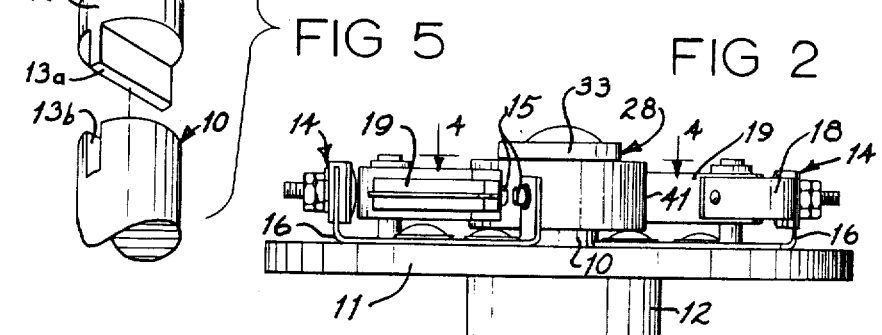
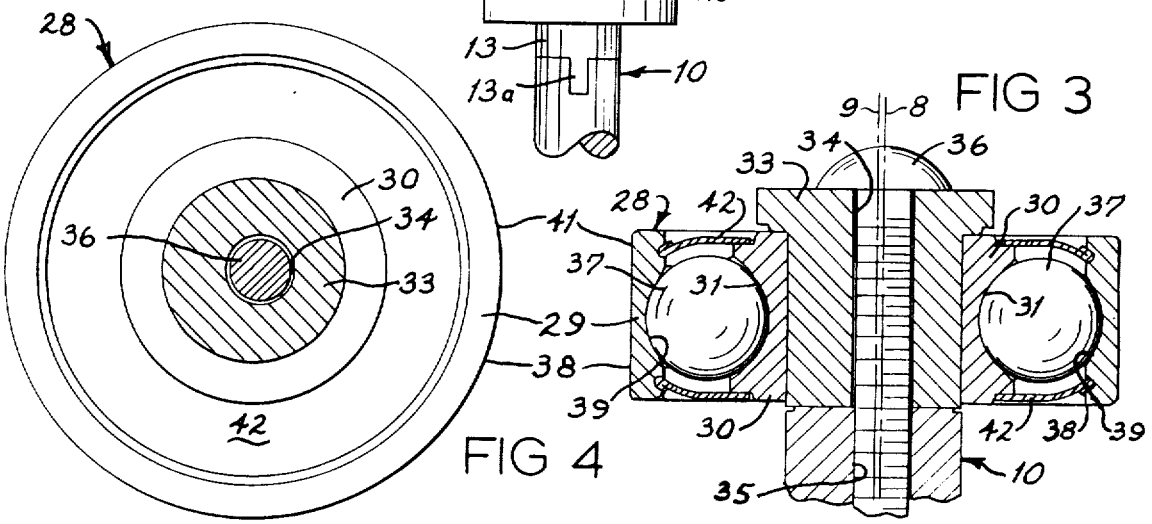

AUTOMOTIVE DISTRIBUTOR CIRCUIT BREAKER WITH ECCENTRICALLY MOUNTED, ROLLER BEARING TYPE CAM

BACKGROUND OF THE INVENTION

The present invention relates basically to the field of art concerning improvements in internal combustion engine ignition systems and specifically to means for actuating the contact breaker points of such ignition systems.

The ignition systems for internal combustion engines are typically supplied with a rotary switching mechanism, commonly referred to as a distributor, that is utilized to provide electrical impulses to ignite a fuel-air mixture, in timed relation to the operation of the engine's power producing elements. This is usually accomplished by a cam that is powered to operate in response to rotation of the engine drive shaft or valve operating cam shaft. The non-circular exterior surface of the cam slidably engages a wiping element of a set of contact points, moving the contact points into and out of engagement in time with the rotational movement of the drive or cam shaft. This frictional rubbing action between the cam and wiper inevitably causes wear between the contacting elements. Such wear changes the effective operation of the contact point assembly since the point gap and the dwell angle, or angle of rotation of the cam during which the contacts remain in an open condition are changed.

This problem is substantially corrected through use of the present invention which provides a stationary actuating surface engaging the wiper. The surface wobbles in response to rotation of the distributor drive shaft to open and close the contact points in response to operation of the engine. The wiper engaging surface is located along the exterior surface of an outside race of a rolling bearing. The inner race of the rolling bearing is fixed to the distributor drive shaft about an axis slightly offset from the rotational axis of the drive shaft. The drive shaft and inner race of the rolling bearing rotate about the drive shaft axis. When engaged with the wiper, the exterior race will remain stationary relative to rotation of the drive shaft and inner race, and will thereby substantially reduce friction between the surface of the outer race and the wiper.

SUMMARY OF THE INVENTION

An improved contact point actuator means is described for use with ignition distributors of the like utilized with internal combustion engines including a distributor drive shaft operatively powered by the engine to rotate about a fixed axis. Such distributors further include at least one set of normally-closed, spring-loaded contact points mounted to a plate adjacent the drive shaft. A wiper is associated with one of said contact points and extends radially toward said distributor drive shaft axis. A contact point actuator is utilized to rotate in response to rotation of said distributor drive shaft to engage said wiper and thereby open and close the contact points. The apparatus of the present invention comprises an improvement in said contact point actuators comprising inner drive member and an outer actuator cylindrical drive member mounted to the drive shaft for rotation therewith.

The drive member includes an axis parallel to and spaced from the drive shaft axis. The drive member further includes an exterior annular surface formed about said central axis. The actuator member includes an annular interior surface operatively engaging the drive member about its exterior surface. The actuator member is freely rotatable relative to the drive member about the actuator axis. The actuator member also includes an exterior wiper-engaging surface radially spaced from the actuator so that rotation of the drive shaft serves to wobble the actuator against the wiper in response to the rotation of the drive shaft and drive member, thereby opening and closing the contact points without frictional wiping action between the exterior surface of the actuator member and the wiper.

It is a primary object of the present invention to present an improved contact point actuator that will substantially reduce friction between the actuator and the wiper element of a set of contact points and therefore increase the operative life of the contact points while also maintaining desired engine ignition and timing characteristics.

It is a further object of my invention to provide such an actuator that is extremely durable and which may be utilized efficiently at relatively high rpm.

These and further objects and advantages will become apparent upon reading the following disclosure which, taken with the accompanying drawings, discloses a preferred form of the present invention.

BRIEF DESCRIPTION OF THE DRAWINGS

A preferred form of the present invention is illustrated in the accompanying drawing in which:

FIG. 1 is a plan view of the present apparatus associated with a set of contact breaker points;

FIG. 2 is an elevational view of the assembly illustrated in FIG. 1;

FIG. 3 is an enlarged sectional view taken substantially along line 3—3 in FIG. 1;

FIG. 4 is an enlarged sectional view taken substantially along line 4—4 in FIG. 2; and FIG. 5 is a pictorial exploded view of a universal distributor drive mechanism utilized to transfer rotational movement to the apparatus of the present invention.

DETAILED DESCRIPTION OF A PREFERRED EMBODIMENT

Referring in greater detail to the drawings, a portion of an internal combustion engine ignition distributor is illustrated. The distributor section illustrated basically comprises a central drive shaft 10, a plate 11 and a lower double row bearing 12 for rotatably journalling the drive shaft 10 relative to the plate 11. Plate 11 is normally held substantially stationary relative to drive shaft 10 and is only partially rotatable to facilitate timing the ignition sequence of the engine.

The distributor drive shaft (FIGS. 2, 3 and 4) connects the distributor's working elements to the engine, for operation in response to operation of the engine. Designed specifically for motorcycles, but not limited thereto, it isolates the point-operating cam from mechanical fluctuations that result from camshaft bearing clearances in such engines. A universal-type joint member 13 had opposed lugs 13a for fitting complementary slots 13b in the drive shaft 10 that enables the distributor to be operated directly from the engine's crank shaft (not shown). This feature enhances proper ignition timing, and improves accuracy and timing duration by directly driving the distributor from the crank shaft, by-passing the usual gear or chain drive to the camshaft which compound backlash or loose-link problems that interfere with proper timing.

Two breaker point assemblies 14 are illustrated. Such assemblies 14 are conventionally comprised of a set of circuit breaker points 15, one of which is mounted to a stationary base 16 and the other movably mounted to a spring-biased arm 19. The arm 19 is movable about a pivot 20 and is biased toward the stationary point by a spring 18. The breaker points 15 therefore lie in a normally closed or engaged position.

Each arm section 19 includes a wiper 21 extending radially toward the fixed rotational axis 8 of drive shaft 10. Normal wear within sets of contact points as illustrated at 14 occurs: (1) between the breaker points 15, due to spark erosion, and (2) along the wiper 21, due to friction caused by relative movement against a conventional actuator cam (not shown).

It is the purpose of the present invention to decrease or eliminate sliding wear along the wiper 21 by eliminating friction relative movement between the wiper and the surface of the actuator utilized to engage and operate the contact points.

An actuator comprising a preferred form of the present invention is illustrated in the drawings and is indicated by the reference numeral 28. Actuator 28 is basically comprised of a rolling bearing 29 eccentrically mounted to the drive shaft 10 through means of a central core 33. The bearing 29 is comprised of an inner member or circular race 30, a plurality of rolling members or ball bearings 37 (FIG. 3) and an outer actuator member 38.

Inner member 30 includes a central bore through which actuator core 33 is press-fitted. Member 30 and core 33 serve as a drive member for actuator 28. A second bore 34 is formed through core 33 at a location radially spaced from the axis 9 of the bearing 29 (the bearing axis and actuator axis being coincidental). A screw 36 extends through bore 34 and into a complementary threaded aperture 35 within drive shaft 10. The screw 36 and core 33 therefore comprise means for mounting the bearing 29 for rotation in response to the rotation of the drive shaft 10 about the fixed drive shaft axis 8, with the axis 9 of the actuator parallel to and spaced from the drive shaft axis.

The ball bearings 37 are interspersed between the inner member 30 where they engage an annular exterior surface 31, and an annular inner surface 39 of the outer actuator member 38. Bearings 37 allow the outer actuator member 38 to rotate freely about the axis 9 of the actuator relative to inner drive member 30 and core 33. Therefore, it may be understood that outer actuator member 38 may rotate freely about the actuator axis 9 while simultaneously being rotated about the fixed drive shaft axis 8.

A vertically spaced set of grease seals 42 are illustrated in FIG. 3 connecting the drive member 30 and outer actuator member 38. Such seals are conventionally included with rolling bearings in order to provide continuous lubrication between surfaces 31 and 39 and the exterior surfaces of the ball bearings 37. It may be noted at this point that other types of rolling members may be utilized as effectively as the ball bearings 37 shown in the drawings. It is conceivable that roller or needle type bearings could also be serviceably utilized with the present invention.

The outer actuator member 38 includes an outer surface 41 that is circular about the axis of the actuator 28. It is this outer surface 41 that engages and operates wipers 21 to alternately open and close the contact points 15.

It is believed from the above descriptions and accompanying drawing that the operation of the present invention may now be easily understood. During rotation of the drive shaft 10, the axis 9 of the actuator is rotated about the drive shaft axis 8. The exterior surface 41 of actuator member 38 is therefore wobbled back and forth due to the eccentric position of the actuator axis 9 on drive shaft 10. This radial wobbling motion is transferred to contact points 15 through wipers 21 engaging the outer actuator member surface 41. Frictional contact between wiper 21 and surface 41 is substantially greater than frictional contact between actuator member 38 and drive member 30 through roller bearings 37. Therefore, such contact will hold actuator member 38 stationary relative to rotational movement of inner drive member 30 and drive shaft 10. Since there is no rubbing contact between the surface 41 and wipers 21, there can be no wear of the wipers due to rubbing friction. It may thus be understood that the operational life of the contact point sets will thereafter be determined by the useful life of breaker points 15.

It may have become obvious from the above description and attached drawing that various changes and modifications may be made therein without departing from the scope of this invention. It is therefore intended that only the following claims are to be taken as definitions of the present invention.

What I claim is:

1. In an ignition distributor of the type mounted on an internal combustion engine and including a distributor drive shaft having an outer end operatively powered by said engine to rotate about a fixed axis, at least one set of normally-closed, spring-loaded contact points mounted to a plate adjacent said distributor drive shaft and having a wiper associated with one of the contact points, said wiper being biased toward the fixed axis, and contact point actuator means mounted to the outer end of the distributor drive shaft for rotation therewith, said contact point actuator means having an exterior surface thereon in engagement with the wiper for operating the wiper in response to rotation of the distributor drive shaft to move the wiper radially with respcet to said fixed axis, thereby opening and closing said contact points, an improvement in said contact point actuator means comprising:

a drive member mounted to the outer end of the distributor drive shaft for rotation therewith about said fixed axis, said member having an eccentric exterior surface centered about an actuator axis parallel to and spaced from said fixed axis;

an actuator member rotatably mounted to the eccentric exterior surface of said drive member for free rotation of said actuator member relative to said drive member about said actuator axis, said actuator member having an exterior surface engaged by said wiper, whereby rotation of said distributor drive shaft serves to rotate said drive member about said fixed axis and permits the actuator member to wobble the exterior surface of said actuator member against the wiper and thereby alternately open and close the contact points without relative sliding movement between said actuator member and said wiper.

2. The improvement set out in claim 1 wherein said exterior surface of said actuator member is cylindrical and is centered about said actuator axis.

3. The improvement set out in claim 2 further comprising a plurality of rolling bearing members interspersed between the eccentric exterior surface of said drive member and the interior surface of said actuator member to provide low friction contact between said actuator member and said drive member.

4. The improvement set out in claim 3 wherein said actuator member and said rolling members are elements of a conventional rolling bearing, and wherein said drive member comprises an inner circular race of said rolling bearing and a central core extending therethrough, said central core being fixed to said inner circular race and being attached to the outer end of said distributor drive shaft with said fixed axis and said actuator axis being parallel and spaced apart.

* * * * *